United States Patent
Sohn

(10) Patent No.: US 10,433,012 B2
(45) Date of Patent: Oct. 1, 2019

(54) ELECTRONIC DEVICE AND CONTENT PROVIDING METHOD THEREOF

(71) Applicant: Samsung Electronics Co., Ltd, Gyeonggi-do (KR)

(72) Inventor: Jeonghyo Sohn, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 15/325,073

(22) PCT Filed: Jul. 8, 2014

(86) PCT No.: PCT/KR2014/006117
§ 371 (c)(1),
(2) Date: Jan. 9, 2017

(87) PCT Pub. No.: WO2016/006729
PCT Pub. Date: Jan. 14, 2016

(65) Prior Publication Data
US 2017/0164055 A1    Jun. 8, 2017

(51) Int. Cl.
*H04N 21/482* (2011.01)
*H04N 21/462* (2011.01)
(Continued)

(52) U.S. Cl.
CPC ........... *H04N 21/462* (2013.01); *H04N 21/23* (2013.01); *H04N 21/23418* (2013.01);
(Continued)

(58) Field of Classification Search
CPC ............... H04N 21/482; H04N 21/462; H04N 21/8549; H04N 21/6581; H04N 21/4823;
(Continued)

(56) References Cited

U.S. PATENT DOCUMENTS

2003/0126605 A1*  7/2003  Betz ................... H04N 5/44543
                                                        725/39
2006/0039481 A1*  2/2006  Shen ........................ H04N 5/45
                                                        375/240.25
(Continued)

FOREIGN PATENT DOCUMENTS

JP        5511946 B2    6/2014
KR     1020100083641    7/2010
(Continued)

OTHER PUBLICATIONS

International Search Report dated Mar. 17, 2015 in connection with International Application No. PCT/KR2014/006117, 5 pages.
(Continued)

*Primary Examiner* — Junior O Mendoza

(57) ABSTRACT

A content providing method of an electronic device comprises the steps of: downloading, from a server, an organization schedule including content organization information for each channel; downloading, from the server, a highlight image of at least one content organized for a first channel on the basis of first channel organization information of the organization schedule; and sequentially reproducing the downloaded highlight images on the basis of the first channel organization information of the organization schedule. However, the present invention is not limited to the embodiments set forth above, and other embodiments are possible.

16 Claims, 6 Drawing Sheets

(51) Int. Cl.
    *H04N 21/23*      (2011.01)
    *H04N 21/472*      (2011.01)
    *H04N 21/647*      (2011.01)
    *H04N 21/234*      (2011.01)
    *H04N 21/262*      (2011.01)
    *H04N 21/658*      (2011.01)
    *H04N 21/8549*      (2011.01)

(52) U.S. Cl.
    CPC ..... *H04N 21/26258* (2013.01); *H04N 21/472* (2013.01); *H04N 21/482* (2013.01); *H04N 21/4823* (2013.01); *H04N 21/64784* (2013.01); *H04N 21/6581* (2013.01); *H04N 21/8549* (2013.01)

(58) Field of Classification Search
    CPC ....... H04N 21/26258; H04N 21/64784; H04N 21/472; H04N 21/23418; H04N 21/23
    See application file for complete search history.

(56) References Cited

U.S. PATENT DOCUMENTS

| | | | | |
|---|---|---|---|---|
| 2008/0081640 | A1* | 4/2008 | Tran | H04N 5/44543 455/456.3 |
| 2010/0095345 | A1* | 4/2010 | Tran | G11B 27/105 725/131 |
| 2010/0180298 | A1 | 7/2010 | Kim et al. | |
| 2011/0145862 | A1* | 6/2011 | Kim | H04N 21/262 725/41 |
| 2012/0210356 | A1* | 8/2012 | Kiok | H04N 21/23109 725/39 |
| 2012/0260293 | A1* | 10/2012 | Young | H04N 21/4314 725/52 |
| 2014/0081157 | A1 | 3/2014 | Joeken | |
| 2015/0382068 | A1* | 12/2015 | Shimy | H04N 21/482 725/40 |
| 2018/0098017 | A1* | 4/2018 | Vaysman | H04N 21/84 |

FOREIGN PATENT DOCUMENTS

| | | |
|---|---|---|
| KR | 1020110068101 | 6/2011 |
| KR | 1020130113554 | 10/2013 |
| KR | 101398995 B1 | 5/2014 |

OTHER PUBLICATIONS

Written Opinion of the International Searching Authority dated Mar. 17, 2015 in connection with International Application No. PCT/KR2014/006117, 5 pages.

\* cited by examiner

ELECTRONIC DEVICE AND CONTENT PROVIDING METHOD THEREOF

CROSS-REFERENCE TO RELATED APPLICATION(S)

The present application claims priority under 35 U.S.C. § 365 to International Patent Application No. PCT/KR2014/006117 filed Jul. 8, 2014, entitled "ELECTRONIC DEVICE AND CONTENT PROVIDING METHOD THEREOF" which is incorporated herein by reference into the present disclosure as if fully set forth herein.

TECHNICAL FIELD

Various embodiments of the present invention relate to technology for providing broadcast content in an electronic device.

BACKGROUND ART

Normally a user can watch broadcast content, being transmitted through a cable or an IPTV network, on a TV. The user can enjoy broadcast content transmitted in real time from a broadcast station or enjoy desired broadcast content at a user's desired time through a video on demand (VOD) service.

Recently, with the development of communication technology and the like, mobile electronic devices such as smart phones and tablet PCs are widely used. Using the mobile electronic devices having a communication function, the user comes to have a need to enjoy broadcast content regardless of a place and time. Accordingly, technique to provide this service is required.

DISCLOSURE OF INVENTION

Technical Problem

Today, in order to provide broadcast contents to users through mobile electronic devices such as smart phones and tablet PCs, broadcast service providers have developed and distributed a broadcast viewing application which is executable in the mobile electronic devices. The user can select and enjoy desired broadcast content by executing the broadcast viewing application. Additionally, the broadcast service providers can provide a highlight image of broadcast content through the broadcast viewing application, thereby inducing the user to view the content.

The highlight image or full version image of broadcast content is transmitted in real time from a server through a network. In this case, network traffic may increase and thus cause a reduction in a network connection speed and an increase in a network fee.

Solution to Problem

A content providing method of an electronic device according to an embodiment of the present invention includes operations of downloading an organization schedule including channel-by-channel content organization information from a server; downloading a highlight image of at least one content organized for a first channel from the server, based on first channel organization information of the organization schedule; and sequentially playing the downloaded highlight image, based on the first channel organization information of the organization schedule.

An electronic device according to an embodiment of the present invention includes a communication unit connected to a server; a control unit configured to download an organization schedule including channel-by-channel content organization information from the server, to download a highlight image of at least one content organized for a first channel from the server, based on first channel organization information of the organization schedule, and to sequentially play the downloaded highlight image, based on the first channel organization information of the organization schedule; a storage unit configured to store the downloaded organization schedule and the downloaded highlight image; and a display unit configured to display the highlight image being played.

Advantageous Effects of Invention

According to the content providing method of the electronic device in an embodiment of the present invention, the highlight image is provided by means of download and thus any additional network connection is not required even through repeatedly offering highlight images.

The electronic device according to an embodiment of the present invention may receive the organization schedule from the server and perform the channel formation by itself, thus avoiding repeated download of highlight images of the same content.

MODE FOR THE INVENTION

Figure 1:
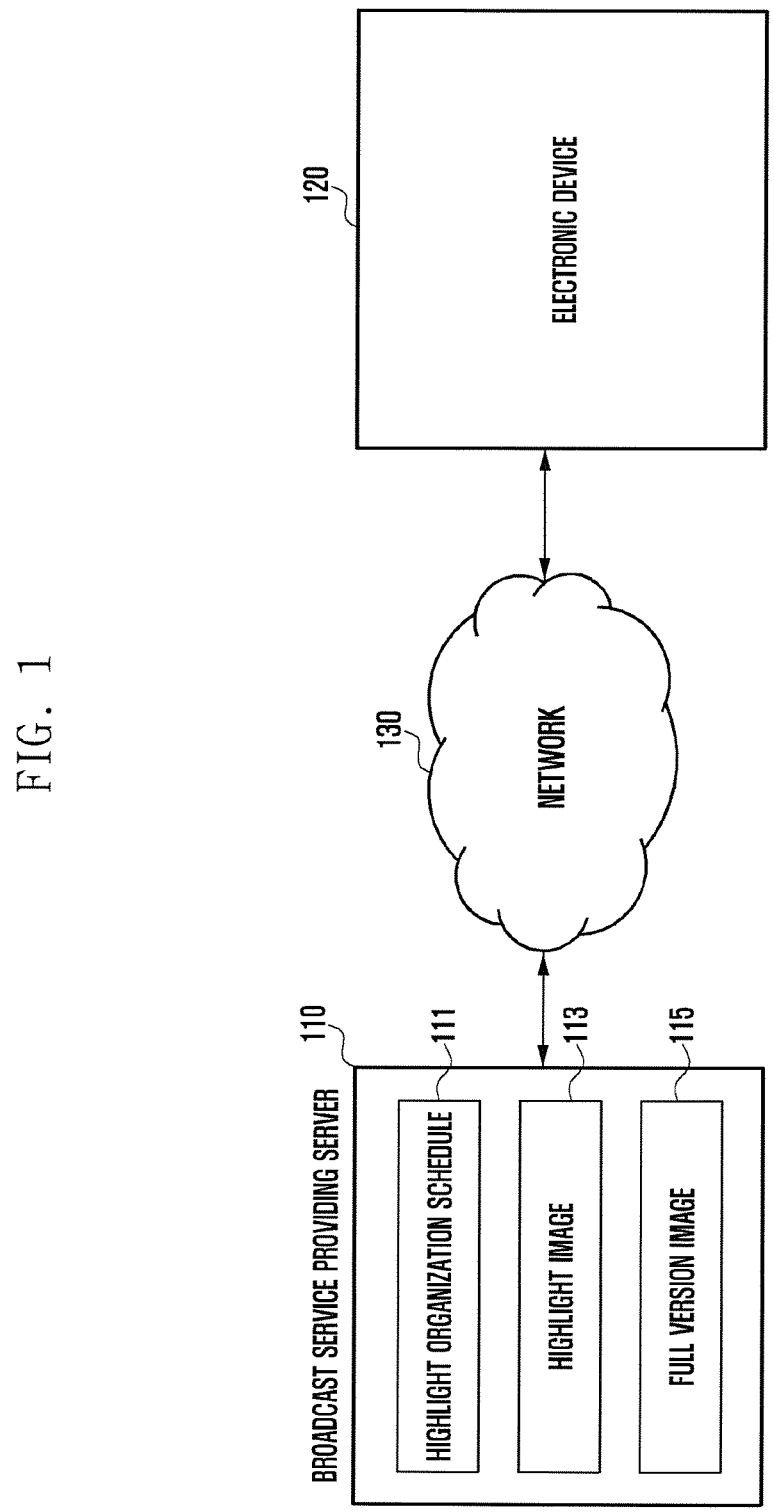
FIG. 1 shows a broadcast service providing system according to an embodiment of the present invention.

Hereinafter, the present invention will be described with reference to the accompanying drawings. Although specific embodiments are illustrated in the drawings and related detailed descriptions are discussed herein, the present invention may have various modifications and several embodiments. However, various embodiments of the present invention are not limited to a specific implementation form and it should be understood that the present invention includes all changes and/or equivalents and substitutes included in the spirit and scope of various embodiments of the present invention. In connection with descriptions of the drawings, similar components are designated by the same reference numeral.

The term "include" or "may include" which may be used in describing the present invention refers to the existence of a corresponding disclosed function, operation or element which can be used in various embodiments of the present invention and does not limit one or more additional functions, operations or elements. In various embodiments of the present invention, the terms such as "include" or "have" may be construed to denote a certain characteristic, number, step, operation, element, component, or a combination thereof, but may not be construed to exclude the existence of or a possibility of addition of one or more other characteristics, numbers, steps, operations, elements, components, or combinations thereof.

In this disclosure, the expression "or" includes any or all of combinations of words listed together. For example, the expression "A or B" may include A, may include B, or may include both A and B.

The expression "1", "2", "first", or "second" used herein may modify various elements of this invention but does not limit the corresponding elements. For example, the above expressions do not limit the sequence and/or importance of the elements. The expressions may be used for distinguishing one element from other elements. For example, a first user device and a second user device indicate different user devices although both of them are user devices. For example, without departing from the scope of the present invention, a first structural element may be referred to as a second structural element. Similarly, the second structural element also may be referred to as the first structural element.

When it is stated that an element is "coupled to" or "connected to" another element, the element may be directly coupled or connected to another element or a new element may exist between the element and another element. In contrast, when it is stated that an element is "directly coupled to" or "directly connected to" another element, a new element does not exist between the element and another element.

The terms used in describing various embodiments of the present invention are only examples for describing a specific embodiment but do not limit the various embodiments of the present invention. Singular forms are intended to include plural forms unless the context clearly indicates otherwise.

Unless defined differently, all terms used herein, which include technical terminologies or scientific terminologies, have the same meaning as that understood by a person skilled in the art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined herein.

An electronic device according to the present invention may be a device including a communication function. For example, the electronic device may be one or a combination of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, or a wearable device (e.g., a head-mounted-device (HMD) such as electronic glasses, electronic clothes, electronic bracelet, an electronic necklace, an electronic appcessary, an electronic tattoo, or a smart watch).

According to some embodiments, the electronic device may be a smart home appliance having a communication function. The smart home appliance may include, for example, at least one of a television (TV), a digital video disk (DVD) player, an audio player, an air conditioner, a cleaner, an oven, a microwave oven, a washing machine, an air cleaner, a set-top box, a TV box (e.g., Samsung Home-Sync™, Apple TV™, or Google TV™), game consoles, an electronic dictionary, an electronic key, a camcorder, or an electronic frame.

According to some embodiments, the electronic device may include at least one of various types of medical devices (e.g., magnetic resonance angiography (MRA), magnetic resonance imaging (MRI), computed tomography (CT), a scanner, an ultrasonic device, and the like), a navigation device, a global positioning system (GPS) receiver, an event data recorder (EDR), a flight data recorder (FDR), a vehicle infotainment device, electronic equipment for a ship (e.g., a navigation device for ship, a gyro compass, and the like), avionics, a security device, or an industrial or home robot.

According to some embodiments, the electronic device may include at least one of furniture or a part of a building/structure, an electronic board, an electronic signature receiving device, a projector, or various types of measuring devices (e.g., a water meter, an electricity meter, a gas meter, a radio wave meter, and the like). The electronic device according to the present invention may be one or a combination of the above described various devices. It is apparent to those skilled in the art that the electronic device according to this invention is not limited to the above described devices.

FIG. 1 shows a broadcast service providing system according to an embodiment of the present invention.

Referring to FIG. 1, the broadcast service providing system may include a broadcast service providing server 110 and an electronic device 120.

The broadcast service providing server 110 may manage information of contents provided by a plurality of content providers, organize a plurality of channels using the contents, and provide the contents to a client device, for example, the electronic device 120 through a connection of a network 130. According to various embodiments, the broadcast service providing server 110 may include a plurality of content providers, and may manage and relay information of contents provided by a plurality of separate content providers.

The broadcast service providing server 110 may receive and store content information, for example, a content ID, additional information, and the like, from a plurality of content providers. The broadcast service providing server 110 may organize content organization schedules of a plurality of channels by using the stored content information.

According to an embodiment, the broadcast service providing server 110 may store a highlight organization schedule 111 and a highlight image 113. The broadcast service providing server 110 may provide the highlight images of a plurality of contents to the electronic device 120 through at least one channel. The broadcast service providing server 110 may form and store the highlight organization schedule 111 which includes highlight image organization information for each channel. According to an embodiment, the broadcast service providing server 110 may directly create and store the highlight image 113 of content, and may receive and store the highlight image 113 of content from a plurality of separate content providers.

According to an embodiment, the broadcast service providing server 110 may store a full version image 115 of content and transmit the stored full version image 115 at the request of the electronic device 120. Alternatively, the full version image 115 of content may be transmitted from the separate content provider to the electronic device 120.

The electronic device 120 may access content provided by the broadcast service providing server 110 by executing, for example, a broadcast viewing application. The electronic device 120 may download an organization schedule including channel-by-channel content organization information from the broadcast service providing server 110. The organization schedule may include the highlight organization schedule 111. According to various embodiments, the electronic device 120 may download in real time the organization schedule provided by the broadcast service providing server 110, or when executing the broadcast viewing application, may request and download the organization schedule from the broadcast service providing server 110. An updated organization schedule may be downloaded in real time.

Based on the highlight organization schedule 111 of the downloaded organization schedule, the electronic device 120 may request and download the highlight image 113 organized for at least one channel from the broadcast service providing server 110. According to an embodiment, the electronic device 120 may sequentially download the highlight images 113 organized for respective channels in a certain order of channels. Also, the highlight images 113 may be sequentially downloaded in the order of organization in the channel. In addition, the electronic device 120 may not download the highlight image 113 which has been already downloaded once. According to an embodiment, the electronic device 120 may download in advance the highlight image for each channel regardless of a content playback request.

The electronic device 120 may sequentially play the downloaded highlight images, based on the channel organization information of the highlight organization schedule 111. When a playback of the highlight images is completed according to the channel organization information in the corresponding channel, the electronic device 120 may repeatedly play the highlight images in the order. According to various embodiments, the electronic device 120 may sequentially play the highlight images of the default channel when executing the broadcast viewing application, or sequentially play the highlight images of a channel selected by the user. The electronic device 120 may play the highlight images while changing channels in response to a user's request, and the channels may have a circular structure.

According to an embodiment, when receiving a user's input for selecting content during the playback of a certain highlight image, the electronic device 120 may receive and play or download a full version image of the content corresponding to the highlight image, being played, from the broadcast service providing server 110. According to another embodiment, when receiving a user's input for selecting content during the playback of a certain highlight image, the electronic device 120 may notify this to the broadcast service providing server 110. Then the broadcast service providing server 110 may enable the electronic device 120 to access the content provider and then receive and play or download the full version image. According to an embodiment, when receiving a notification about a content selection input from the electronic device 120, the broadcast service providing server 110 may transmit related information of the corresponding content to the electronic device 120 such that the user can see the related information. Then, if the user wants to purchase the content, the broadcast service providing server 110 may switch to a content detail page provided by the service provider such that the user can purchase and play or download the full version image. The content is broadcasting content and may include real-time broadcasting, such as terrestrial broadcasting and cable broadcasting, and video on demand (VOD) broadcasting. Therefore, when receiving a user's input for selecting content, the electronic device 120 may play real-time broadcasting or play or download VOD broadcasting content.

The network 130 may be a broadcast network or a communications network. The network 130 may include, as a wireless communication network, at least one of wireless fidelity (Wifi), near field communication (NFC), and cellular communication (e.g., LTE, LTE-A, CDMA, WCDMA, UMTS, WiBro or GSM). The network 130 may include, as a wired communication network, at least one of a universal serial bus (USB), a high definition multimedia interface (HDMI), a recommended standard 232 (RS-232), or a plain old telephone service (POTS).

Figure 2:
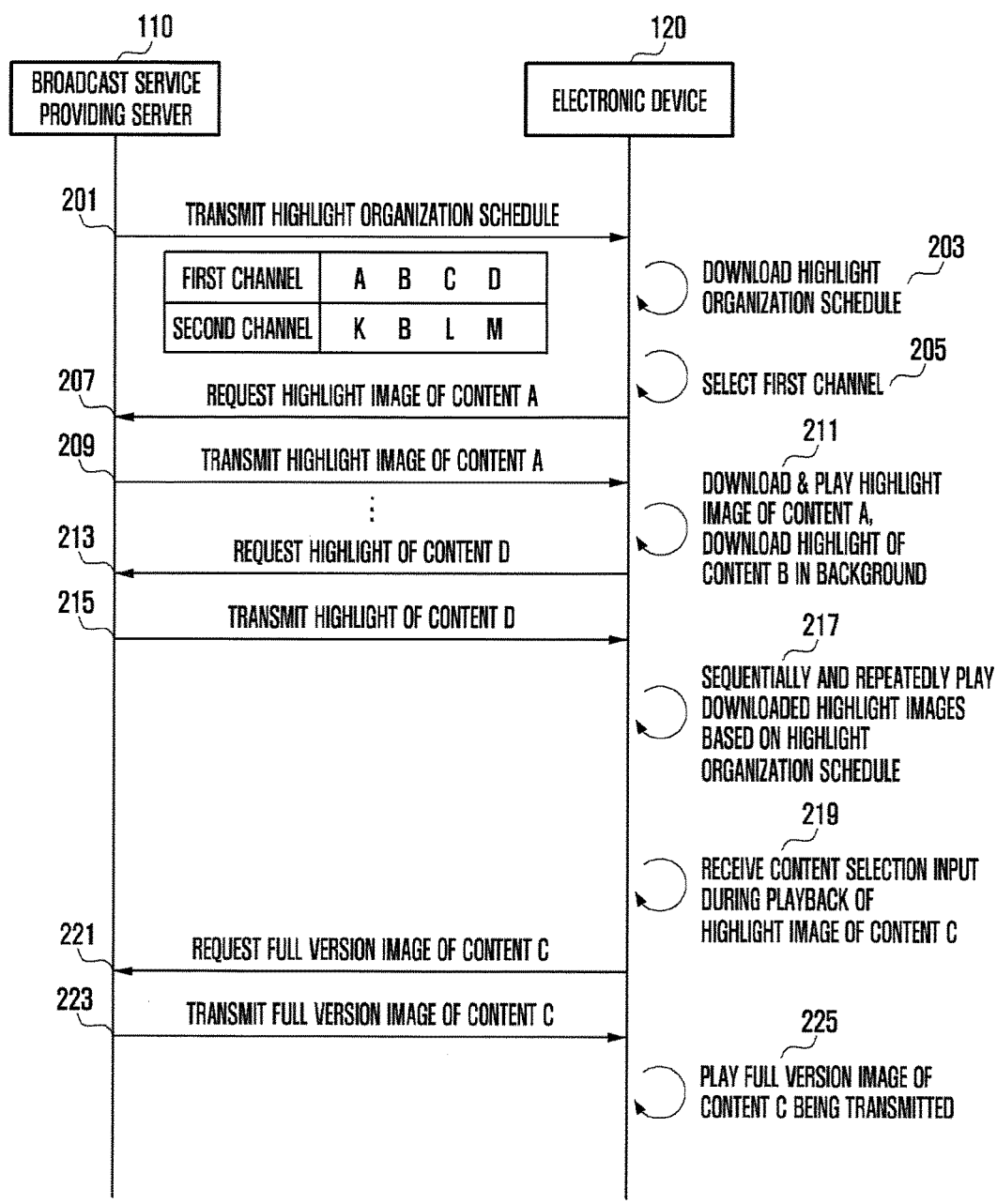
FIG. 2 shows a flow diagram illustrating a broadcast service providing method according to an embodiment of the present invention.

FIG. 2 shows a flow diagram illustrating a broadcast service providing method according to an embodiment of the present invention. Although it is assumed in FIG. 2 that the broadcast service providing server 110 includes a content provider, it is apparent to those skilled in the art that the embodiment of the present invention is not limited to this.

At operation 201, the broadcast service providing server 110 may transmit the organization schedule including the highlight organization schedule to the electronic device 120 which is a client device. For example, the highlight organization schedule may include information about the first channel sequentially formed of contents A, B, C and D, and the second channel sequentially formed of contents K, B, L and M.

At operation 203, the electronic device 120 may download the organization schedule including the highlight organization schedule provided by the broadcast service providing server 110. The electronic device 120 may form each channel, based on the downloaded highlight organization schedule. In this embodiment, forming the channel may refer to downloading the highlight image of content organized for the channel and then mapping at least one highlight image to the channel, based on the highlight organization schedule. At operation 250, the first channel may be selected by setting or a user's selection, and thereby the formation of the first channel may be requested in the electronic device 120.

When the formation of the first channel is requested, the electronic device 120 may first send a request for the highlight image of content A to the broadcast service providing server 110 at operation 207 according to the highlight organization schedule. In response to the request, the broadcast service providing server 110 may transmit the highlight image of the content A to the electronic device 120 at operation 209. Subsequently, the electronic device 120 may request and download the highlight images of contents B and C from the broadcast service providing server 110. At operation 211, the electronic device 120 may download the highlight image of the content A and, if there is a playback request for the first channel, may play the highlight image of the content A upon the completion of download. According to an embodiment, the electronic device 120 may download the highlight image of the content B in the background while playing the highlight image of the content A. In addition, in some cases, the highlight images of the contents C and D may also be downloaded in the background. Although not shown in the drawings, if the highlight image of the content B is completely downloaded when the playback of the highlight image of the content A is completed, the highlight image of the content B may be played. Similarly, if the highlight image of the content C is completely downloaded when the playback of the highlight image of the content B is completed, the highlight image of the content C may be played. If the playback of the highlight image is completed but the download of the next highlight image is not completed, the played highlight image may be repeatedly played until the next highlight image is downloaded.

At operation 213, the electronic device 120 may request the broadcast service providing server 110 to provide the highlight image of the content D organized for the end of the first channel, and the broadcast service providing server 110 may transmit the highlight image of the content D to the electronic device 120 in response to the request. The electronic device 120 may download the highlight image of the content D. When downloading all the highlight images of the contents organized for the first channel, the electronic device 120 may sequentially and repeatedly play the downloaded highlight images in accordance with the highlight organization schedule at operation 217. Namely, after the highlight images of the contents A, B, C and D are completely played in sequence, the highlight images of the contents A, B, C and D may be played again in sequence until the user stops the playback.

At operation 219, the electronic device 120 may receive a content selection input from the user while a certain highlight image, e.g., the highlight image of the content C, is played. In this case, at operation 221, the electronic device 120 may request the broadcast service providing server 110 to provide the full version image of the content C corresponding to the highlight image being played. Then, in response to this request, the broadcast service providing server 110 may transmit the full version image of the content C to the electronic device 120. The electronic device 120 may play the full version image of the content C in real time.

Figure 3:
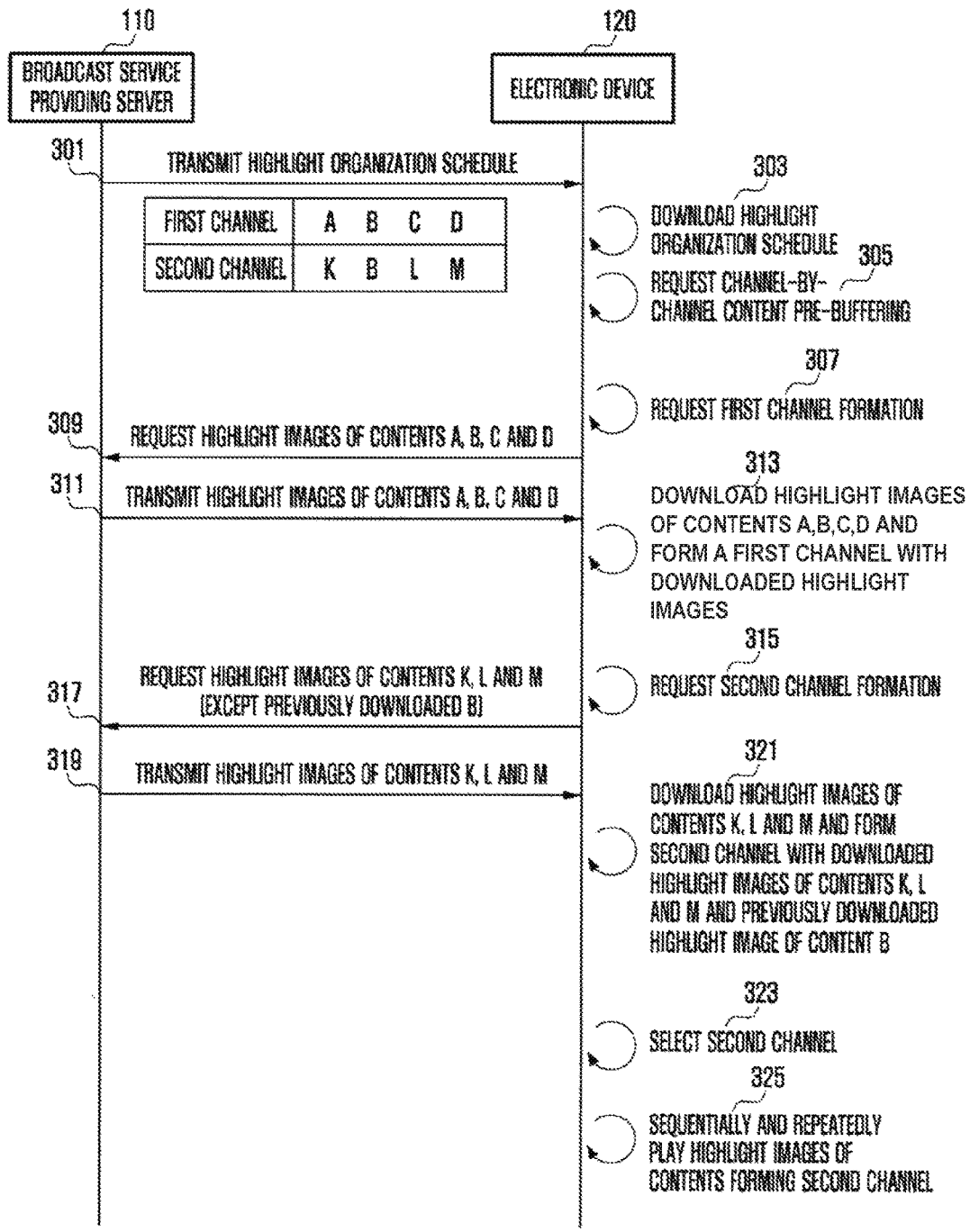
FIG. 3 shows a flow diagram illustrating a broadcast service providing method according to an embodiment of the present invention.

FIG. 3 shows a flow diagram illustrating a broadcast service providing method according to an embodiment of the present invention. Although it is assumed in FIG. 3 like FIG. 2 that the broadcast service providing server 110 includes a content provider, it is apparent to those skilled in the art that the embodiment of the present invention is not limited to this.

At operation 301, the broadcast service providing server 110 may transmit the organization schedule including the highlight organization schedule to the electronic device 120 which is a client device. For example, the highlight organization schedule may include information about the first channel sequentially formed of contents A, B, C and D, and the second channel sequentially formed of contents K, B, L and M.

At operation 303, the electronic device 120 may download the organization schedule including the highlight organization schedule provided by the broadcast service providing server 110. According to an embodiment, when the organization schedule is downloaded, the electronic device 120 may have a content pre-buffering request for each channel at operation 305 without a user's request for a channel playback. Namely, even if there is no playback request, the electronic device 120 may form each channel in advance, based on the downloaded highlight organization schedule.

At operation 307, the electronic device 120 may request the formation of the first channel, for example, based on a certain or determined order of channels contained in the highlight organization schedule. At operation 309, the electronic device 120 may request the broadcast service providing server 110 to provide the highlight images of contents A, B, C and D organized for the first channel. In response to this request, the broadcast service providing server 110 may transmit the highlight images of the contents A, B, C and D to the electronic device 120 at operation 311.

At operation 313, the electronic device 120 may download the highlight images of the contents A, B, C and D (a detailed download method may be the same as shown in FIG. 2) and then form the first channel with the downloaded highlight images based on the highlight organization schedule.

Thereafter, at operation 315, the electronic device 120 may request the formation of the second channel, for example. At operation 317, the electronic device 120 may request the broadcast service providing server 110 to provide the highlight images of the remaining contents other than the already downloaded content B among the contents K, B, L and M organized for the second channel. Namely, the electronic device 120 may not download again the highlight image of the overlapping content. Therefore, network traffic caused by image transmission may be reduced effectively. At operation 319, the broadcast service providing server 110 may transmit the highlight images of the contents K, L and M to the electronic device 120.

At operation 321, the electronic device 120 may download the highlight images of the contents K, L and M and then form the second channel with the downloaded highlight images of the contents K, L and M based on the highlight organization schedule and the already downloaded highlight image of the content B. Thereafter, when a selection input for playing a certain channel, for example, the second channel, is received at operation 323, the electronic device 120 may sequentially and repeatedly play the highlight images of the contents forming the second channel at operation 325 according to the highlight organization schedule. Namely, after the highlight images of the contents K, B, L and M are completely played in sequence, the highlight images of the contents K, B, L and M may be played again in sequence until the user stops the playback.

Although not shown in this drawing, the electronic device 120 may request, as shown in FIG. 2, the full version image of the content corresponding to the highlight image, being played, from the broadcast service providing server 110 if a content selection input is received from the user while a certain highlight image is played. Then the electronic device 120 may receive the full version image of the content from the broadcast service providing server 110 and play the full version image in real time.

Figure 4:
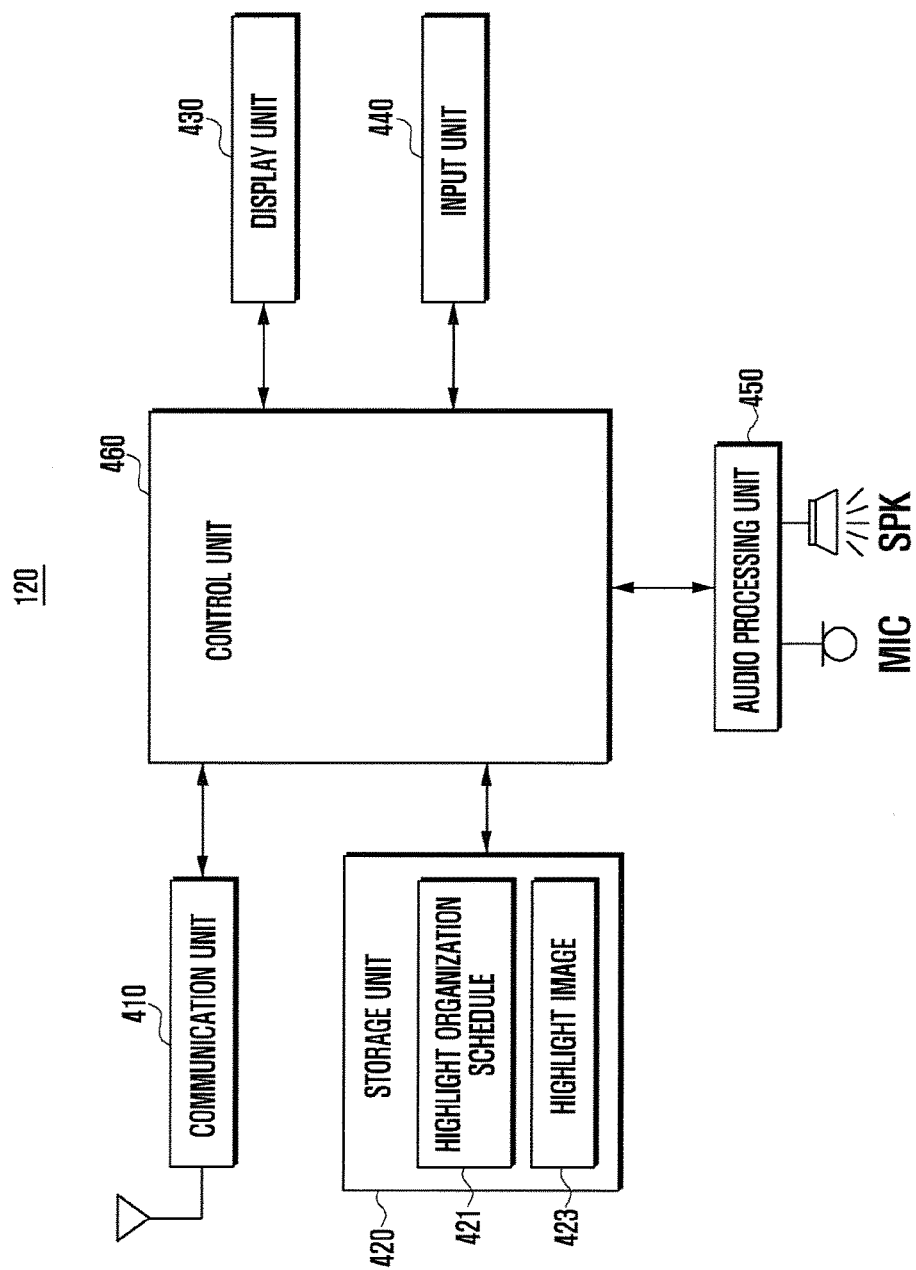
FIG. 4 shows a block diagram illustrating an electronic device according to an embodiment of the present invention.

FIG. 4 shows a block diagram illustrating an electronic device according to an embodiment of the present invention.

Referring to FIG. 4, the electronic device 120 may include a communication unit 410, a storage unit 420, a display unit 430, an input unit 440, an audio processing unit 450, and a control unit 460.

The communication unit 410 may connect communication between the electronic device 120 and the broadcast service providing server 110. For example, the communication unit 410 may connect the electronic device 120 and the broadcast service providing server 110 through a broadcast network or a communication network.

The storage unit 420 may store instructions or data received from the control unit 460 or any other element or created by the control unit 460 or any other element, and also store an operating system and various applications. The storage unit 420 according to this embodiment may store a highlight organization schedule 421 and a highlight image 423 which are downloaded from the broadcast service providing server 110.

The display unit 430 may include a display panel. For example, the display panel may be a liquid-crystal display (LCD), an active-matrix organic light-emitting diode (AM-OLED), or the like. For example, the display panel may be implemented to be flexible, transparent or wearable. The display panel may be formed as a single module together with a touch panel of the input unit 440 to be described below.

The input unit 440 may include a touch panel, a pen sensor, and a key input unit. For example, the touch panel may recognize a touch input in a capacitive manner, in a pressure sensitive manner, in an infrared manner, and/or in an ultrasonic manner. The touch panel may further include a control circuit. In case of a capacitive manner, physical contact or proximity recognition is possible. The touch panel may further include a tactile layer. In this case, the touch panel may offer a tactile reaction to the user.

The audio processing unit 450 may convert sound into electric signals and vice versa. For example, the audio processing unit 450 may process sound information inputted through a microphone (MIC) or to be outputted through a speaker (SPK).

The control unit 460 may control a plurality of hardware or software elements connected thereto by driving an operating system or an application, and may perform processing and operation of various kinds of data including multimedia data. The control unit 460 according to an embodiment of this invention may access content provided by the broadcast service providing server 110 by executing, for example, a broadcast viewing application. The control unit 460 may download the organization schedule including channel-by-channel content organization information from the broadcast service providing server 110 through the communication unit 410. The organization schedule may include the highlight organization schedule. According to various embodiments, the control unit 460 may download in real time the organization schedule provided by the broadcast service providing server 110, or when executing the broadcast viewing application, may request and download the organization schedule from the broadcast service providing server 110. Also, an updated organization schedule may be downloaded in real time.

Based on the highlight organization schedule of the downloaded organization schedule, the control unit 460 may request and download the highlight image organized for at least one channel from the broadcast service providing server 110. According to an embodiment, the control unit 460 may sequentially download the highlight images organized for respective channels in a certain order of channels. Also, the highlight images may be sequentially downloaded in the order of organization in the channel. In addition, the control unit 460 may not download the highlight image which has been already downloaded once. According to an embodiment, the control unit 460 may download in advance the highlight image for each channel regardless of a content playback request.

The control unit 460 may sequentially play the downloaded highlight images, based on the channel organization information of the highlight organization schedule, and then output this through the display unit 430 and the speaker (SPK). When the playback of the highlight images is completed according to the channel organization information in the corresponding channel, the control unit 460 may repeatedly play the highlight images in the order. According to various embodiments, the control unit 460 may sequentially play the highlight images of the default channel when executing the broadcast viewing application, or sequentially play the highlight images of a channel selected by the user. The control unit 460 may play the highlight images while changing channels in response to a user's request, and the channels may have a circular structure.

According to an embodiment, when receiving a user's input for selecting content through the input unit 440 during the playback of a certain highlight image, the control unit 460 may receive and play or download a full version image of the content corresponding to the highlight image, being played, from the broadcast service providing server 110. According to another embodiment, when receiving a user's input for selecting content during the playback of a certain highlight image, the control unit 460 may notify this to the broadcast service providing server 110. Then the broadcast service providing server 110 may enable the control unit 460 to access the content provider through the communication unit 410 and then receive and play or download the full version image.

Figure 5:
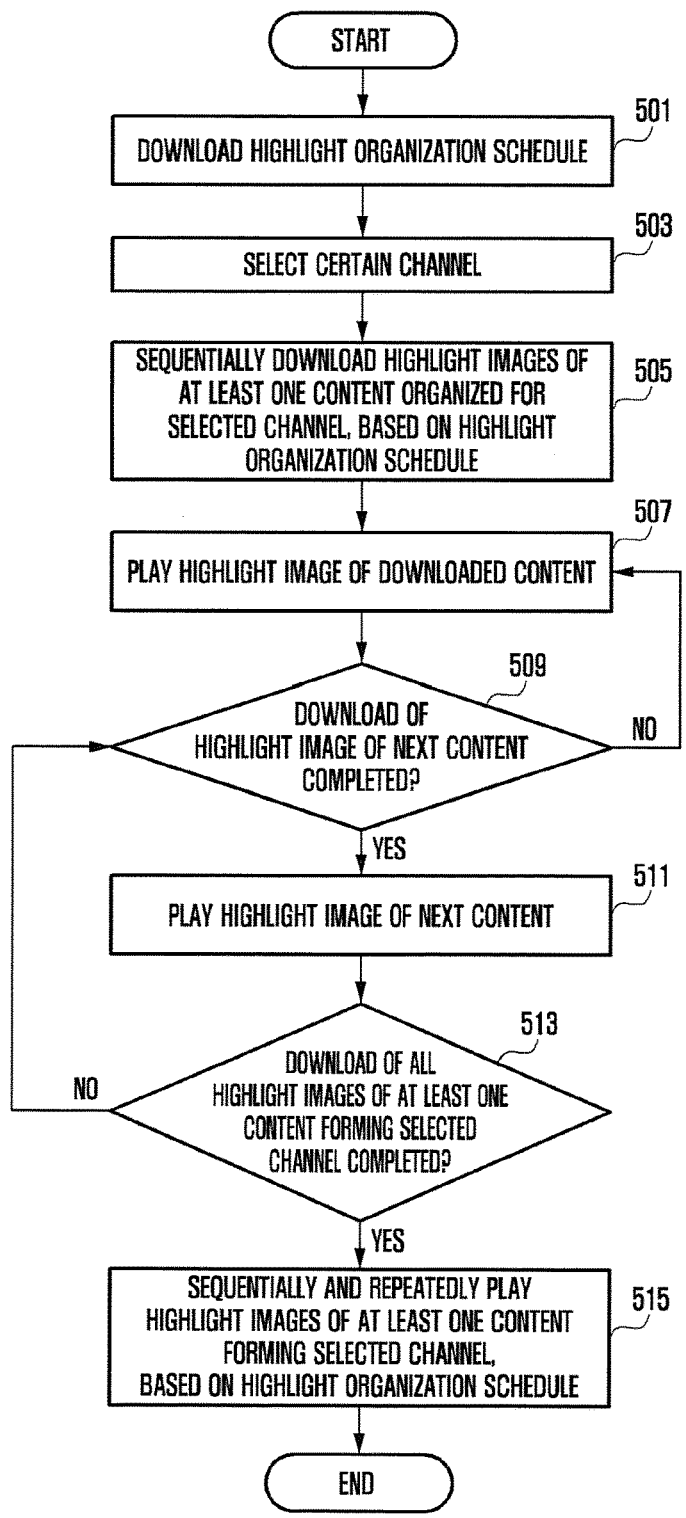
FIG. 5 shows a flow diagram illustrating a content providing method of an electronic device according to an embodiment of the present invention.

FIG. 5 shows a flow diagram illustrating a content providing method of an electronic device according to an embodiment of the present invention.

At operation 501, the control unit 460 may download the organization schedule including the highlight organization schedule from the broadcast service providing server 110 through the communication unit 410 and store the organization schedule in the storage unit 420. The control unit 460 may form respective channels, based on the downloaded highlight organization schedule. At operation 503, the control unit 460 may select a certain channel from among the channels contained in the highlight organization schedule by setting or a user's selection at operation 503, and request the formation of the selected channel.

At operation 505, the control unit 460 may sequentially download the highlight images of at least one content organized for the channel from the broadcast service providing server 110, based on the highlight organization schedule. The downloaded highlight images may be stored in the storage unit 420. When the highlight image of the content organized firstly is downloaded completely, the control unit 460 may play the highlight image at operation 507. When the playback of the highlight image is finished, the control unit 460 may check at operation 509 whether the highlight image of the next content is downloaded completely. If the download is not completed, the highlight image that has been played may be played repeatedly. If the download is completed, the control unit 460 may play the highlight image of the next content at operation 511. According to various embodiments, when the download of the highlight image of the next content is completed, the control unit 460 may immediately terminate the highlight image, being repeatedly played, and then play the highlight image of the next content, or may play the highlight image, being repeatedly played, to the end and then play the highlight image of the next content.

When the playback of the highlight image of the next content is completed, the control unit 460 may check at operation 513 whether the highlight image of the at least one content forming the selected channel is completely downloaded. If the download is not completed, the control unit 460 may perform the operation 509 again. If the download is completed, the control unit 460 may sequentially and repeatedly play the highlight image of the at least one content forming the selected channel at operation 515, based on the highlight organization schedule.

Meanwhile, although not shown in the drawing, if any content selection input is received through the input unit 440 during the playback of the highlight image, the control unit 460 may regard this input as a request for the full version image, receive the full version image of the content corresponding to the highlight image being played from the broadcast service providing server 110, and then play the received full version image.

Figure 6:
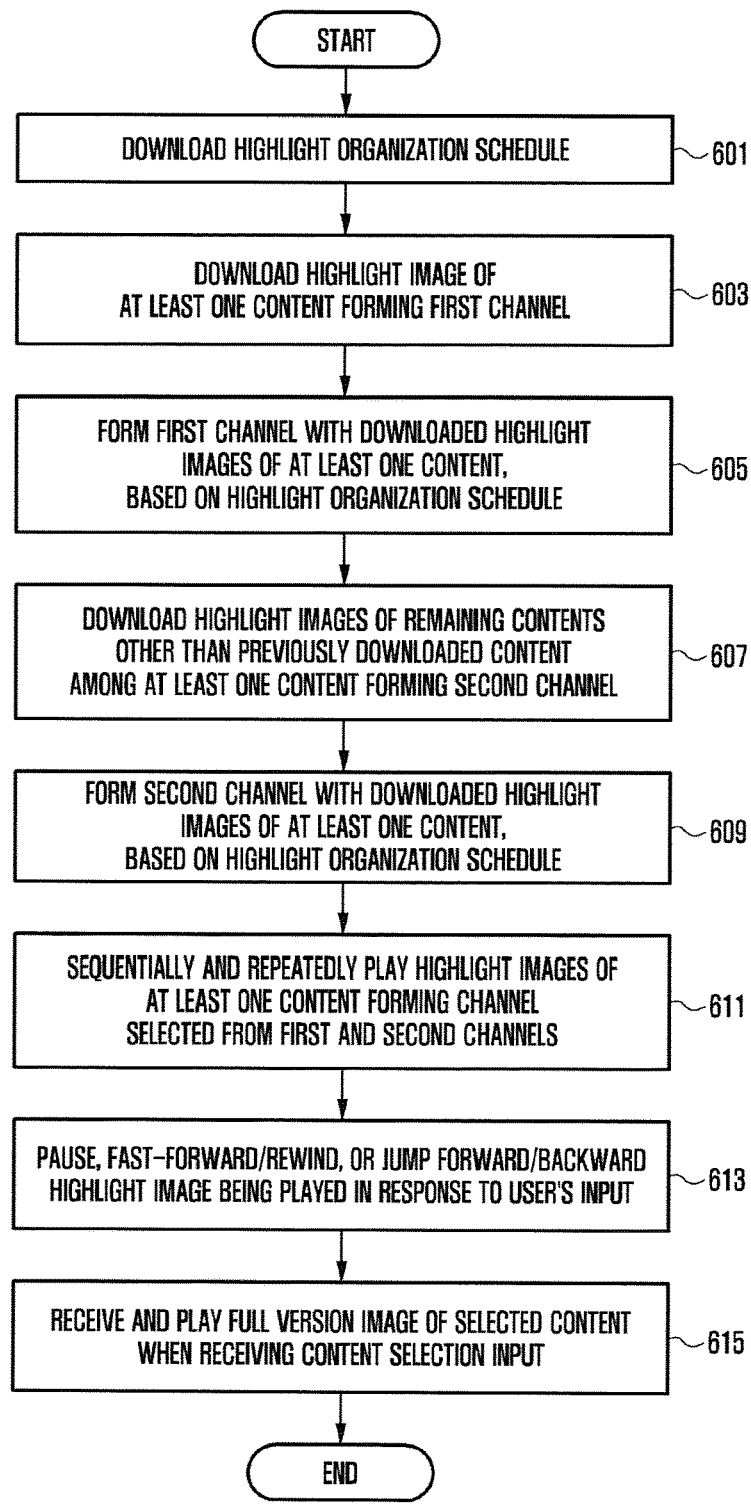
FIG. 6 shows a flow diagram illustrating a content providing method of an electronic device according to an embodiment of the present invention.

FIG. 6 shows a flow diagram illustrating a content providing method of an electronic device 120 according to an embodiment of the present invention.

At operation 601, the control unit 460 may download the organization schedule including the highlight organization schedule from the broadcast service providing server 110 through the communication unit 410 and then store the organization schedule in the storage unit 420. The control unit 460 may form respective channels, based on the highlight organization schedule. According to an embodiment, when the organization schedule is downloaded, the control unit 460 may form in advance respective channels, based on the downloaded highlight organization schedule even if there is no user's request for a channel playback.

The control unit 460 may request the formation of the first channel, for example, based on a certain or determined order of channels contained in the highlight organization schedule. At operation 603, the control unit 460 may download the highlight images of at least one content forming the first channel from the broadcast service providing server 110 and then store the highlight images in the storage unit 420. The highlight image of any overlapping content may be downloaded only once. At operation 605, the control unit 460 may form the first channel with the downloaded highlight images of the at least one content, based on the highlight organization schedule.

Thereafter, the control unit 460 may request the formation of the second channel, for example. At operation 607, the control unit 460 may download, from the broadcast service providing server 110, the highlight images of the remaining contents other than the previously downloaded content among the contents forming the second channel, and then store the downloaded highlight images in the storage unit 420. At operation 609, the control unit 460 may form the second channel with the downloaded highlight image of the at least one content, based on the highlight organization schedule.

At operation 611, if any selection input for playing the first or second channel is received, the control unit 460 may sequentially and repeatedly play the highlight images of the at least one content forming the selected channel.

At operation 613, the control unit 460 may pause, fast-forward/rewind, or jump forward/backward the highlight image being played in response to a user's input. When any input for selecting content, the control unit 460 may receive the full version image of the content corresponding to the highlight image, being played, from the broadcast service providing server 110 and then play the full version image.

According to various embodiments, at least part of the device (e.g., the electronic device 120 and modules) or method (e.g., operations) according to this disclosure may be implemented as commands stored, e.g., in the form of program module, in computer-readable storage media. In case commands are executed by at least one processor, this processor may perform a particular function corresponding to the commands. The computer-readable storage medium may be, for example, the memory. At least some of the program module may be implemented (e.g., executed) by, for example, the processor. At least some of the program module may include, for example, a module, a program, a routine, a set of instructions, and/or a process for performing one or more functions.

The non-transitory computer-readable recording medium may include magnetic media such as a hard disk, a floppy disk, and a magnetic tape, optical media such as a compact disc read only memory (CD-ROM) and a digital versatile disc (DVD), magneto-optical media such as a floptical disk, and hardware devices, such as a read only memory (ROM), a random access memory (RAM), or a flash memory, specially configured to store and perform program instructions (e.g., programming modules). In addition, the program instructions may include high class language codes, which can be executed in a computer by using an interpreter, as well as machine codes made by a compiler. The aforementioned hardware device may be configured to operate as one or more software modules in order to perform the operation of various embodiments of this invention, and vice versa.

A module or programming module according to the present disclosure may include or exclude at least one of the above-discussed elements or further include any other element. The operations performed by the module, programming module or any other element according to the present disclosure may be executed sequentially, in parallel, repeatedly, or by a heuristic method. Additionally, some operations may be executed in different orders or omitted, or any other operation may be added.

While the present invention has been particularly shown and described with reference to an exemplary embodiment thereof, it will be understood by those skilled in the art that various changes in form and details may be made therein without departing from the scope of the invention as defined by the appended claims.

The invention claimed is:

1. A content providing method of an electronic device, the method comprising operations of:
   downloading an organization schedule including highlight organization information from a server, wherein the organization schedule comprises at least a first channel and a second channel;
   detecting a channel selection of the first channel after downloading the organization schedule;
   sequentially downloading respective first channel highlight images of a plurality of contents in a first sequence for the first channel from the server, based on the highlight organization information;
   sequentially playing the downloaded first channel highlight images of the plurality of contents in the first sequence while downloading remaining undownloaded highlight images of the plurality of contents in the first sequence, based on the highlight organization information;
   detecting a channel selection of the second channel after the channel selection of the first channel;
   sequentially downloading respective second channel highlight images of a plurality of contents in a second sequence for the second channel from the server, based on the highlight organization information; and
   sequentially playing downloaded second channel highlight images and at least one of the first channel highlight images previously downloaded in the second sequence based on the highlight organization information.

2. The method of claim 1, wherein downloading the first channel highlight images includes an operation of downloading a highlight image of remaining contents in a background while a highlight image of completely downloaded content among at least one content organized for the first channel is played.

3. The method of claim 2, wherein the method further includes an operation of repeatedly playing the first channel highlight images or the second channel highlight images of the content being played until the first channel highlight images or the second channel highlight images of next content are completely downloaded.

4. The method of claim 1, wherein the method further includes an operation of pausing, fast-forwarding/rewinding, or jumping forward/backward highlight images being played in response to a user's input.

5. The method of claim 1, wherein the method further includes an operation of repeating a sequential playback of the downloaded first channel highlight images or the downloaded second channel highlight images.

6. The method of claim 1, further comprising an operation of:
receiving a content selection input during a playback of the first channel highlight images or the second channel highlight images of content selected from among at least one content organized for the first channel or the second channel.

7. The method of claim 6, further comprising at least one of operations of:
receiving a full version image of the content selected by the content selection input from the server and playing the full version image in real time;
downloading a full version image of the content selected by the content selection input from the server; or
receiving related information of the content selected by the content selection input from the server, providing the information through an interface, and when the selected content is purchased through the interface, receiving for a real-time playback or downloading a full version image of the selected content from the server.

8. The method of claim 1, further comprises downloading highlight images of the content organized for the second channel including operations of:
checking whether there is same content having a previously downloaded highlight image among at least one content organized for the second channel; and
downloading a highlight image of remaining contents other than the same content among the at least one content organized for the second channel.

9. An electronic device comprising:
a receiver configured to receive data from a server;
a storage configured to store an organization schedule and highlight images;
a display configured to display the highlight images; and
a controller configured to:
download, via the receiver, the organization schedule including highlight organization information from the server, wherein the organization schedule comprises at least a first channel and a second channel,
detect a channel selection of the first channel after downloading the organization schedule,
sequentially download, via the receiver, respective first channel highlight image of a plurality of contents in a first sequence for the first channel from the server, based on the highlight organization information,
sequentially play downloaded first channel highlight images of the plurality of contents in the first sequence while download remaining undownloaded highlight images of the plurality of contents in the first sequence, based on the highlight organization information,
detect a channel selection of the second channel after the channel selection of the first channel,
sequentially download, via the receiver, respective second channel highlight images of a plurality of contents in a second sequence for the second channel from the server, based on the highlight organization information, and
sequentially play downloaded second channel highlight images and at least one of the first channel highlight images previously downloaded in the second sequence based on the highlight organization information.

10. The electronic device of claim 9, wherein the controller is further configured to download a highlight image of remaining contents in a background while a highlight image of completely downloaded content among at least one content organized for the first channel is played.

11. The electronic device of claim 10, wherein the controller is further configured to repeatedly play the first channel highlight images or the second channel highlight images of content being played until the first channel highlight images or the second channel highlight images of next content are completely downloaded.

12. The electronic device of claim 9, wherein the controller is further configured to pause, fast-forward/rewind, or jump forward/backward the highlight images being played in response to a user's input.

13. The electronic device of claim 9, wherein the controller is further configured to repeat a sequential playback of the downloaded first channel highlight images or the downloaded second channel highlight images.

14. The electronic device of claim 9, further comprising:
a touch panel configured to receive a content selection input during a playback of the first channel highlight images or the second channel highlight images of content selected from among at least one content organized for the first channel or the second channel.

15. The electronic device of claim 14, wherein the controller is further configured to control at least one of operations of receiving a full version image of the content selected by the content selection input from the server and playing the full version image in real time, downloading a full version image of the content selected by the content selection input from the server, or receiving related information of the content selected by the content selection input from the server, providing the information through an interface, and when the selected content is purchased through the interface, receiving for a real-time playback or downloading a full version image of the selected content from the server.

16. The electronic device of claim 9, wherein the controller is further configured to check whether there is same content having a previously downloaded highlight image among at least one content organized for the second channel, and to download a highlight image of remaining contents other than the same content among the at least one content organized for the second channel.

* * * * *